United States Patent
Dutt et al.

(10) Patent No.: US 8,938,406 B2
(45) Date of Patent: Jan. 20, 2015

(54) CONSTRUCTING A BAYESIAN NETWORK BASED ON RECEIVED EVENTS ASSOCIATED WITH NETWORK ENTITIES

(75) Inventors: Rajeev Dutt, Redmond, WA (US); Jonathan Bradshaw, Ebersberg (DE)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 13/384,516

(22) PCT Filed: Jul. 30, 2009

(86) PCT No.: PCT/US2009/052222
§ 371 (c)(1),
(2), (4) Date: Jan. 17, 2012

(87) PCT Pub. No.: WO2011/014169
PCT Pub. Date: Feb. 3, 2011

(65) Prior Publication Data
US 2012/0117009 A1 May 10, 2012

(51) Int. Cl.
*G06N 7/00* (2006.01)
*H04L 12/24* (2006.01)
*H04L 29/06* (2006.01)
*H04L 29/08* (2006.01)
(Continued)

(52) U.S. Cl.
CPC .............. *G06N 7/005* (2013.01); *H04L 41/065* (2013.01); *H04L 41/069* (2013.01); *H04L 41/142* (2013.01)
USPC .......................................................... 706/12

(58) Field of Classification Search
CPC ....... G06F 15/18; G06F 15/00; G06N 99/005; G06K 9/6256; G06Q 10/10
USPC ...................................................... 706/12, 62
See application file for complete search history.

(56) References Cited

U.S. PATENT DOCUMENTS 6,076,083 A * 6/2000 Baker .............................. 706/52
6,442,694 B1 * 8/2002 Bergman et al. ................ 726/22
(Continued)

FOREIGN PATENT DOCUMENTS

| CN | 1529455 A | 9/2004 |
|----|-----------|--------|
| WO | WO-2008000290 A1 | 1/2008 |
| WO | WO-2008107020 A1 | 9/2008 |

OTHER PUBLICATIONS

Rish, "Distributed Systems Diagnosis Using Belief Propagation", Annual Allerton Conference on Communication, Control, and Computing, CD ROM Editon; p. 1727-1736, 43rd; Annual Allerton Conference on Communication, control and computing (Annual Allerton conference), Year of publication: 2005.*

(Continued)

*Primary Examiner* — Jeffrey A Gaffin
*Assistant Examiner* — Ilya Traktovenko

(57) ABSTRACT

Records of events associated with network entities in a network environment are received, where the network entities are selected from hardware entities, software entities, and combinations of hardware and software entities. The records of the events are identified to identify relationships between events associated with different ones of the network entities, where the records of the events identify corresponding network entities impacted by the events. A Bayesian network is constructed based on the analyzing, wherein the constructed Bayesian network is able to make predictions regarding relationships between events associated with the network elements.

19 Claims, 2 Drawing Sheets

(51) Int. Cl.
*H04L 29/12* (2006.01)
*H04L 29/14* (2006.01)

(56) References Cited

U.S. PATENT DOCUMENTS

| | | |
|---|---|---|
| 6,529,891 B1 * | 3/2003 | Heckerman .................... 706/52 |
| 6,879,973 B2 | 4/2005 | Skaanning |
| 6,957,202 B2 | 10/2005 | Skaanning |
| 7,426,502 B2 | 9/2008 | Bronstein |
| 2002/0019870 A1 * | 2/2002 | Chirashnya et al. .......... 709/224 |
| 2002/0183988 A1 | 12/2002 | Skaanning |
| 2003/0065986 A1 * | 4/2003 | Fraenkel et al. ................ 714/47 |
| 2003/0078686 A1 * | 4/2003 | Ma et al. ........................ 700/91 |
| 2004/0143561 A1 | 7/2004 | Jensen |
| 2004/0225927 A1 * | 11/2004 | Warpenburg et al. ........... 714/47 |
| 2005/0021485 A1 * | 1/2005 | Nodelman et al. .............. 706/21 |
| 2005/0038772 A1 * | 2/2005 | Colrain ............................ 707/1 |
| 2005/0114739 A1 * | 5/2005 | Gupta et al. .................... 714/39 |
| 2005/0120109 A1 | 6/2005 | Delic |
| 2005/0216585 A1 * | 9/2005 | Todorova et al. ............. 709/224 |
| 2006/0242288 A1 * | 10/2006 | Masurkar ..................... 709/223 |
| 2007/0260911 A1 | 11/2007 | Marilly |
| 2008/0025231 A1 | 1/2008 | Sharma |
| 2008/0168020 A1 | 7/2008 | D'Ambrosio |
| 2010/0070589 A1 * | 3/2010 | Shaw et al. ................... 709/206 |
| 2010/0223217 A1 * | 9/2010 | Little .............................. 706/19 |

OTHER PUBLICATIONS

European Patent Office, Extended European Search Report, Jan. 2, 2013, 42 pages, Munich, Germany.

Cohen et al: Correlating instrumentation data to system states; a building block for automated diagnosis and control, OSDI 2004, 6th Symposium on Operating Systems Design and Implentation (14 pages).

Dadzie et al, Journal of Intelligent Manufacturing, Applying Semantic Web Technologies • to Knowledge Sharing in Aerospace Engineering, Jun. 2008 (20 pages).

Devitt et al., Applied Ontology (2006) Constructing Bayesian Networks Automatically using Ontologies (11 pages).

Devitt et al., Ontology-driven Automatic Construction of Bayesian Networks for Telecommunication Network Management, Nov. 2006 (13 pages).

Ghahramani, Learning Dynamic Bayesian Networks, Oct. 1997 (31 pages).

Thomas R. Gruber, A Translation Approach to Portable Ontology Specifications, Knowledge Systems Laboratory, Technical Report KSL 92-71 Sep. 1992 (27 pages).

Korean Intellectual Property Office, International Search Report and Written Opinion for PCT/US2009/052222 dated Apr. 21, 2010 (10 pages).

Lanfranchi et al., Extracting and Searching Knowledge for the Aerospace Industry, ESTC dated May 2007 (5 pages).

* cited by examiner

CONSTRUCTING A BAYESIAN NETWORK BASED ON RECEIVED EVENTS ASSOCIATED WITH NETWORK ENTITIES

CROSS-REFERENCE TO RELATED APPLICATION

This application is a national stage application under 35 U.S.C. §371 of PCT/US2009/052222, filed 30 Jul. 2009.

BACKGROUND

In a network environment where there are a relatively large number of network entities that can span multiple geographic regions, it may be difficult to quickly identify the impact of an outage or defect at one or more network entities on other parts of the network.

Some network environments may maintain knowledge databases (sometimes referred to as configuration management databases) regarding the configuration of the network. In response to detected outages, an administrator can consult the knowledge database to attempt to determine what impact the outage of defect would have on other parts of the network. For a large network environment, manually consulting this knowledge database to perform the diagnosis can be a time-consuming and tedious task, which may ultimately produce inaccurate results.

Moreover, a knowledge database can become obsolete relatively quickly. Thus, even if an automated process is provided to consult such a knowledge database to diagnose impacts of outages or defects at network entities, such automated processes may nevertheless produce inaccurate results if the knowledge database is not updated.

BRIEF DESCRIPTION OF THE DRAWINGS

Some embodiments of the invention are described with respect to the following figures.

DETAILED DESCRIPTION

Figure 1:
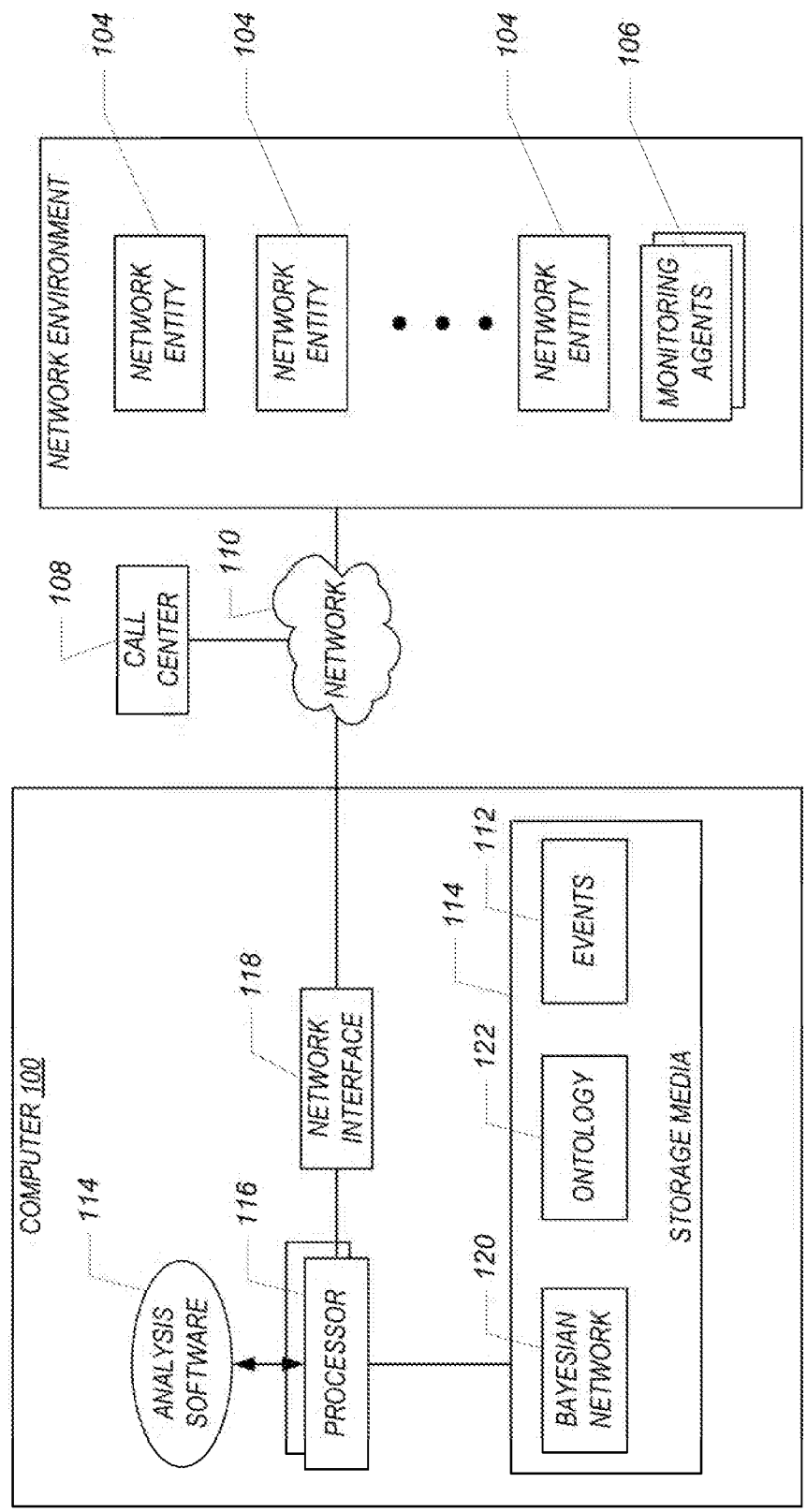
FIG. 1 is a block diagram of an exemplary arrangement that incorporates an embodiment of the invention.

In accordance with some embodiments, an automated learning system is provided to determine cause and effect relationships between events occurring in a network environment that includes network entities. Some network environments can include a relatively large number of network entities (which can be hardware entities, software entities, and/or combinations of hardware and software entities). For example, network entities can include computers, switches, routers, storage servers, and so forth. Software entities can include software applications, web software, scripts, and so forth.

The automated learning system receives records of events associated with network entities in the network environment. In some embodiments, the events represented by the records are fault events that indicate something wrong has occurred at corresponding network entities. For example, the network entity may have crashed or may have produced an error that caused inaccurate outputs to be produced. In other embodiments, the events can represent other occurrences associated with the network entities. More generally, an "event" refers to an occurrence of some phenomenon, act, operation, alarm, and so forth, at or in connection with a network entity.

The records of the events are analyzed to identify relationships between events associated with different ones of the network entities. Each of the records of the events identifies a corresponding network entity impacted by the event. The order in which the events are received is significant. The event ordering can occur temporally (events received in time) or the event ordering can occur spatially (events received over a given space). In the former case, the events will indicate a causal (cause-and-effect) relationship, such as event A has a high likelihood of preceding event B. In the latter case, the events will indicate a spatial relationship, such as event A has a high likelihood of being near event B. The automated learning system constructs a Bayesian network based on the analyzing.

The constructed Bayesian network is able to make predictions regarding relationships (e.g., causal relationships, spatial relationships, etc.) between events connected with the network elements. For example, the Bayesian network can predict events associated with some of the network entities based on detecting events at others of the network entities. As another example, the Bayesian network can diagnose a source of a problem based on detected events at one or more network entities. In addition, based on analyzing the events, the Bayesian network can be used to output a representation of the infrastructure of the network environment. This can assist administrators in maintaining updated system interconnections as changes are continually made in the network environment, which can be a tedious and time-consuming task.

A Bayesian network is a probabilistic structured representation of a domain to allow existing knowledge to be captured about the domain. The Bayesian network is able to learn the stochastic properties of the domain (on a continual and real-time basis, for example) to update a model of the domain over time. A Bayesian network has a directed acyclic graph structure, where the directed acyclic graph has nodes that represent variables from the domain, and arcs between the nodes represent dependencies between the variables. The arcs of the Bayesian network also are associated with conditional probability distributions over the variables, where the conditional probability distributions encode the probability that variables assume different values given values of parent variables in the graph. More generally, a Bayesian network is a graphical model for representing conditional dependencies between, random variables of a domain. In accordance with some embodiments, the domain is a network environment having network entities that are associated with events, such as fault events.

In the context of representing a network environment having interconnected network entities, the nodes of the Bayesian network represent corresponding network entities, and the arcs between the nodes are associated with conditional probability distributions that represent likelihoods of events associated with some of the network entities being related to events associated with others of the network entities.

FIG. 1 illustrates an exemplary arrangement in which some embodiments of the invention can be incorporated. In FIG. 1, a network environment 102 includes various network entities 104, and possibly one or more monitoring agents 106. The monitoring agents 106 can be part of the network entities 104 or separate from the network entities 104. The monitoring agents 106 are used for monitoring operations of the network entities 104. Thus, any outages or defects at the network entities 104 can be detected by the monitoring agents 106. Note that the network entities 104 can be software entities, hardware entities, or combinations of software and hardware entities. The monitoring agents 106 are able to create records of the events detected by the monitoring agents.

FIG. 1 also shows a call center 108. The call center 108 can receive calls from users of the network environment 102 regarding any errors that are experienced by the users. Call agents at the call center 108 can then create records regarding the calls received about events that have occurred in the network environment 102.

The records generated at the call center 108 and/or the monitoring agents 106 can be sent to an analysis computer 100 over a network 110. A "record" regarding an event refers to any representation of the event. The record can have a predefined format, be in a predefined language, or can have any other predefined structure. The record associated with a particular event identifies the network entity, such as by using a configuration identifier or some other type of identifier. In some embodiments, the records can also identify different types of events that may have occurred. For example, the records may identify different types of fault events (such as fault events that caused a network entity crash (outage), fault events that produced data error, software fault events, hardware fault events, fault events associated with defects, and so forth).

The records of the events are stored as events 112 in a storage media 114 in the computer 100. The storage media 114 can be implemented with one or more disk-based storage devices and/or integrated circuit or semi-conductor memory devices. The computer 100 includes analysis software 114 that is able to analyze the events 112 received from the call center 108 and/or monitoring agents 106.

The analysis software 114 is executable on one or more processors 116, which is (are) connected through a network interface 118 to the network 110 to allow the computer 100 to communicate over the network 110. Although shown as a single block, it is contemplated that the computer 100 can refer to either a single computer node or to multiple computer nodes.

The analysis software 114 implements the automated learning system referred to above for analyzing events associated with network entities in a network environment for constructing a Bayesian network 120 that identifies relationships between the events associated with different ones of the network entities 104 in the network environment 102. The constructed Bayesian network 120 is stored in the storage media 114. Note that although the Bayesian network 120 and analysis software 114 are shown as being two separate elements, it is noted that the Bayesian network 120 is part of the analysis software 114 to allow for the capture of knowledge about the network environment based on the records 112 of the events. The Bayesian network 120 can continually update its model of the network environment based on continued receipt of records 112 of the events over time.

The analysis software 114 is able to construct inferences based on the frequency of event types and to automate the entire process from start to end. In some embodiments, the analysis software 114 looks at the propagation of fault events through the network environment 102 (as reported by the event records 112). The relationships can be inferred from the frequency and occurrence of the events as detected by the call center 108 and/or by the monitoring agents 106. As noted above, the event records contain identifiers of corresponding network entities.

In addition, to assist in constructing the Bayesian network 120, an ontology 122 is also created and stored in the storage media 114. The ontology is a structured, machine-readable data model. The ontology 122 models the concepts of the domain being analyzed, in this case the network environment 102. The ontology 122 captures concepts of the domain (and relationships between the concepts) to provide a shared common understanding of the domain. The ontology 122 serves as a repository of knowledge about the network environment 102 to enable the construction of the Bayesian network 120.

In some implementations, the ontology 122 provides a System class with a Components subclass that contains a simple diagnostic parameter that can take on one of the following three values: available, degraded and unavailable. Each network entity can be associated with the foregoing ontology model. Depending upon the state of operation of the network entity, the network entity will have be associated with the diagnostic parameter that is assigned one of the foregoing three values. The value available indicates that the network entity is operating normally. The value degraded indicates that the network entity has degraded performance. The value unavailable indicates that the network entity is down or otherwise not available. Although a specific exemplary ontology is provided above, note that alternative implementations can employ other exemplary ontologies.

The records that are incoming can include unstructured text, which may make conforming to the given ontology relatively difficult. However, if the records are defined to have specific tags that are consistent with the ontology, then an automated process can provided to extract information from the records according to the ontology.

In the process of learning the Bayesian network, analysis is performed of the frequency of the incoming events, categorized by event type, over a period of time. Based on the analyzed event records, the Bayesian network 120 is able to determine the likelihood that different events are related and also determine the type of relationship (e.g., whether it is a cause or an effect relationship). As noted above, there is an order associated with the incoming events, where the order can be a temporal order or a spatial order. A temporal ordering of the events allows for a causal relationship to be derived using the Bayesian network 120. However, a spatial ordering of the events allows for the Bayesian network 120 to learn a spatial relationship among events. In some embodiments, both temporal and spatial ordering of the events are considered in learning the Bayesian network 120.

Once the Bayesian network 120 is trained (learned), the Bayesian network can be used to make predictions. For example, the Bayesian network can predict if an event at network entity A will impact network entity B, or that failure at network entity D is likely caused by a failure at network entity C.

Figures 2, 3:
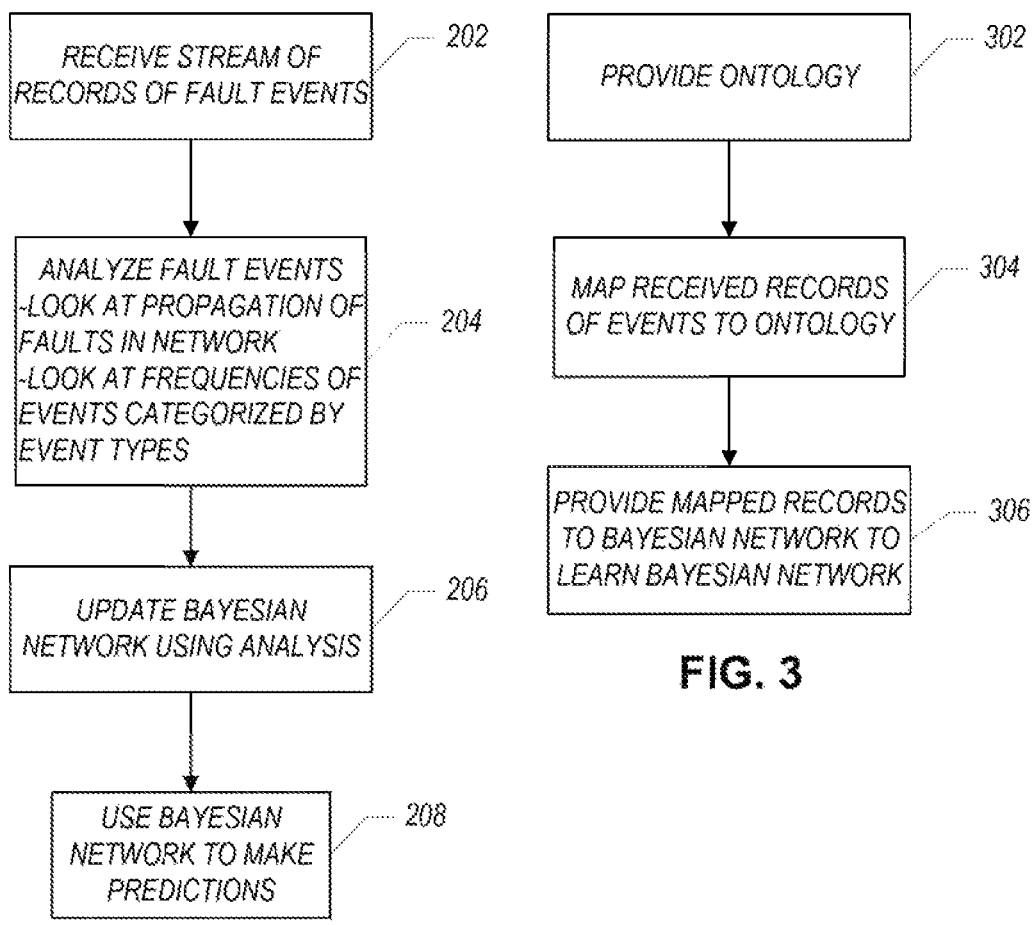
FIG. 2 is a flow diagram of a process of constructing and using a Bayesian network, according to an embodiment.
FIG. 3 is a flow diagram of a process of mapping received records to a provided ontology, according to a further embodiment.

FIG. 2 is a flow diagram of building and using a Bayesian network, in accordance with an embodiment. The process of FIG. 2 can be performed by the analysis software 114 and Bayesian network 120 of FIG. 2.

A stream of records of events is received (at 202). The events in some embodiments are fault events for indicating faults in the network environment 102 (FIG. 1). As noted above, the records can be received from monitoring agents 106 and/or the call center 108.

The information contained in the records of the fault events are analyzed (at 204). The analysis involves looking at the propagation of faults along network entities in the network environment 102. Also, frequencies of fault events categorized by event type (e.g., different types of faults) are also analyzed. Since there is a correspondence between events and network entities (as identified by configuration identifiers in the records), a relationship between events implies an underlying relationship between network entities that the events refer to. Analyzing the frequencies of events categorized by event types allow the Bayesian network 120 to learn conditional probability distributions between fault events associated with the network entities. For example, if occurrences of fault events of a particular type at network entity A correlates frequently with fault events at network entities C and F, then the Bayesian will reflect this relationship in the arcs connecting nodes corresponding to network entities A, C, and F.

Based on the analysis of task 204, the Bayesian network 120 is updated (at 206). The updated Bayesian network 120 is then used (at 208) to make predictions. For example, the predictions can be as follows: if a fault event occurs at network entity A, how will that impact network entity B; if a fault event occurred at network entity D, how likely is it that this fault event was caused by a failure at network entity C.

It is noted that the outputs of the Bayesian network 120 can also be used to discover the network infrastructure of the network environment 102. Propagation of fault events along a particular path will reveal relationships among the network entities along that path. Since the records of events contain identifiers of the network entities, this information can be leveraged to build up a representation of the network infrastructure.

The process of FIG. 2 can be recursively repeated to continually update the Bayesian network 120 as conditions change or as the infrastructure of the network environment 102 changes (e.g., network entities added, network entities removed, or network entities upgraded). In this manner, it is ensured that the model of the network environment 102 used is an updated representation that does not become obsolete quickly.

FIG. 3 is a flow diagram of a process according to a further embodiment. An ontology of the domain to be modeled is provided (at 302), where the domain in this case is the network environment 102. In some implementations, the ontology 122 provides a System class with a Components subclass that contains a simple diagnostic parameter that can take on one of the following three values: available, degraded and unavailable, as discussed above.

The received records of the events are mapped (at 304) to the ontology. This is to allow meaningful information that are relevant to learning the Bayesian network to be extracted. In cases where the received records contain unstructured data, pre-processing can be applied to perform the mapping. Alternatively, tag fields can be provided in the records that contain information relevant to the ontology.

Next, the mapped records are provided (at 306) to the analysis software 114 and Bayesian network 120 to continue to learn the Bayesian network 120.

By employing techniques according to some embodiments, a relatively convenient and automated way of predicting cause and effect relationships (or spatial relationships) among fault events (or other types of events) associated with corresponding network entities of a network environment is achieved. Administrators can be quickly informed of faults such that solutions can be developed, or temporary workaround plans can be developed.

Instructions of software described above (including the analysis software 114 and Bayesian network 120 of FIG. 1) are loaded for execution on a processor (such as processor(s) 116 in FIG. 1). A processor includes microprocessors, microcontrollers, processor modules or subsystems (including one or more microprocessors or microcontrollers), or other control or computing devices.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method comprising:
   receiving records of events associated with network entities in a network environment, wherein the network entities are selected from hardware entities, software entities, and combinations of hardware and software entities;
   analyzing, by a system including one or more processors, the records of the events to identify relationships between events associated with different ones of the network entities, wherein the records of the events identify corresponding network entities impacted by the events;
   constructing, by the system, a Bayesian network based on the analyzing, wherein the constructed Bayesian network is able to make predictions regarding relationships between events associated with the network elements;
   after the constructing of the Bayesian network, discovering, by the system, an infrastructure of the network environment using prediction outputs of the Bayesian network; and
   building, by the system, a representation of the infrastructure of the network environment according to the discovering, the built representation of the infrastructure including the network entities of the network environment and relationships among the network entities.

2. The method of claim 1, further comprising using the Bayesian network to predict events associated with some of the network entities based on detecting events at others of the network entities.

3. The method of claim 1, further comprising using the Bayesian network to diagnose a source of a problem based on detected events at one or more network entities.

4. The method of claim 1, further comprising:
   continually receiving further records of the events associated with the network entities during operation of the network environment; and
   updating the Bayesian network based on the further records of the events.

5. The method of claim 1, wherein receiving the records of the events comprises receiving the records of the events representing faults associated with the network entities.

6. The method of claim 5, wherein the faults include one or more of an outage of a network entity, a defect in a network entity, or a data error produced by a network entity.

7. The method of claim 1, wherein analyzing the records of the events comprises determining a propagation path of faults in the network environment.

8. The method of claim 1, wherein analyzing the records of the events comprises:
analyzing frequencies of the events in a predefined time interval; and
categorizing the events by event type.

9. The method of claim 1, further comprising defining an ontology that defines concepts used for learning the Bayesian network.

10. The method of claim 9, wherein the ontology defines a diagnostic parameter associated with each of the network entities that has a set of predefined potential values.

11. The method of claim 10, wherein the set of predefined potential values includes a first value indicating that the corresponding network entity is operating normally, a second value indicating that the corresponding network entity has a degraded performance, and a third value indicating that the corresponding network entity is unavailable.

12. The method of claim 1, wherein receiving the records of the events comprises receiving the records of the events that have one or both of temporal and spatial ordering, and wherein constructing the Bayesian network takes into account the one or both of the temporal and spatial ordering.

13. A computer comprising:
a storage media to store records of events associated with network entities of a network environment; and
one or more processors to:
analyze the records of events to discover relationships between events, wherein the events identify corresponding network entities, wherein the network entities are selected from hardware entities, software entities, and combinations of hardware and software entities;
using the discovered relationships and the corresponding identified network entities to construct a Bayesian network;
use the Bayesian network to predict whether an event associated with one of the network entities is related to another event associated with another one of the network entities;
after the constructing of the Bayesian network, discover an infrastructure of the network environment using prediction outputs of the Bayesian network; and
build a representation of the infrastructure of the network environment according to the discovering, the built representation of the infrastructure including network entities of the network environment and relationships among the network entities.

14. The computer of claim 13, wherein the events are fault events indicating occurrence of faults at the corresponding network entities.

15. The computer of claim 14, wherein the analysis of the records of the events determines a propagation path of faults in the network environment.

16. The computer of claim 13, wherein the discovered relationships comprises causal relationships between events based on temporal ordering of the events.

17. The computer of claim 13, wherein the discovered relationships comprises spatial relationships between events based on spatial ordering of the events.

18. An article comprising at least one non-transitory computer-readable storage medium containing instructions that upon execution cause a computer to:
receive records of fault events indicating faults associated with network entities in a network environment, wherein the network entities are selected from hardware entities, software entities, and combinations of hardware and software entities;
analyze the records of the fault events to identify relationships between fault events associated with different ones of the network entities, wherein the records of the fault events identify corresponding network entities impacted by the fault events;
construct a Bayesian network based on the analyzing, wherein the constructed Bayesian network is able to make predictions regarding relationships between fault events associated with the network elements;
after the constructing of the Bayesian network, discover an infrastructure of the network environment using prediction outputs of the Bayesian network; and
build a representation of the infrastructure of the network environment according to the discovering, the built representation of the infrastructure including network entities of the network environment and relationships among the network entities.

19. The article of claim 18, wherein the instructions upon execution cause the computer to further perform one or more of:
using the Bayesian network to predict fault events associated with some of the network entities based on detecting fault events at others of the network entities; and
using the Bayesian network to diagnose a source of a problem based on detected fault events at one or more network entities.

* * * * *